United States Patent [19]

Calcagno et al.

[11] Patent Number: 5,038,272
[45] Date of Patent: Aug. 6, 1991

[54] DEVICE FOR TRACKING AND RECORDING THE POSITION REACHED BY A MOVING PART, IN PARTICULAR FOR INDUSTRIAL-ROBOT CONTROL

[75] Inventors: Piero Calcagno; Ernesto De Ferrari, both of Turin, Italy; Bruce L. Beverly; Alan D. McNutt, both of Johnson City, Tenn.

[73] Assignee: Texas Instruments Incorporated, Dallas, Tex.

[21] Appl. No.: 365,882

[22] Filed: Jun. 13, 1989

[30] Foreign Application Priority Data

Oct. 24, 1988 [IT] Italy ................. 67952 A/88

[51] Int. Cl.$^5$ ............................................. G05B 19/42
[52] U.S. Cl. ........................... 364/167.01; 364/513; 364/187; 318/563
[58] Field of Search ............. 364/559, 167.01, 474.28, 364/474.35, 513, 184, 187; 318/563, 568; 901/47

[56] References Cited

U.S. PATENT DOCUMENTS

| | | | |
|---|---|---|---|
| 3,624,640 | 11/1971 | Geller | 340/347 |
| 4,468,745 | 8/1984 | Kjosavik | 364/559 |
| 4,672,279 | 6/1987 | Hosokawa et al. | 318/568 |
| 4,864,508 | 9/1989 | Iwagaya | 364/474.19 |

FOREIGN PATENT DOCUMENTS 0049151 4/1982 European Pat. Off. .
63158402 4/1982 Japan .

OTHER PUBLICATIONS

Rate Transducer–Micron Instrument Corporation
Guide De Selection Pour Transmetteurs Resolvernier Eucron, Eucron S.A.

Primary Examiner—Jerry Smith
Assistant Examiner—Paul Gordon
Attorney, Agent, or Firm—John A. Haug; James P. McAndrews; Melvin Sharp

[57] ABSTRACT

The device is intended to be used for recording the position reached by a moving part, such as the arm of an industrial robot moved by a rotary motor (M). The device comprises, in an assembly capable of being associated with the said moving part, an angular-position transducer such as a resolver (2), capable of generating at least one signal (4, 5) indicating the position reached by the motor (M) during a rotation, counting means (12) connected to the angular-position transducer (2), capable of storing a cumulative count of the signal generated by the transducer (2) itself and indicating the position reached by the moving part, and power supply means such as a buffer battery (18) capable of keeping the position transducer (2) and the counting means (12) active even when there is no external power supply.

14 Claims, 3 Drawing Sheets

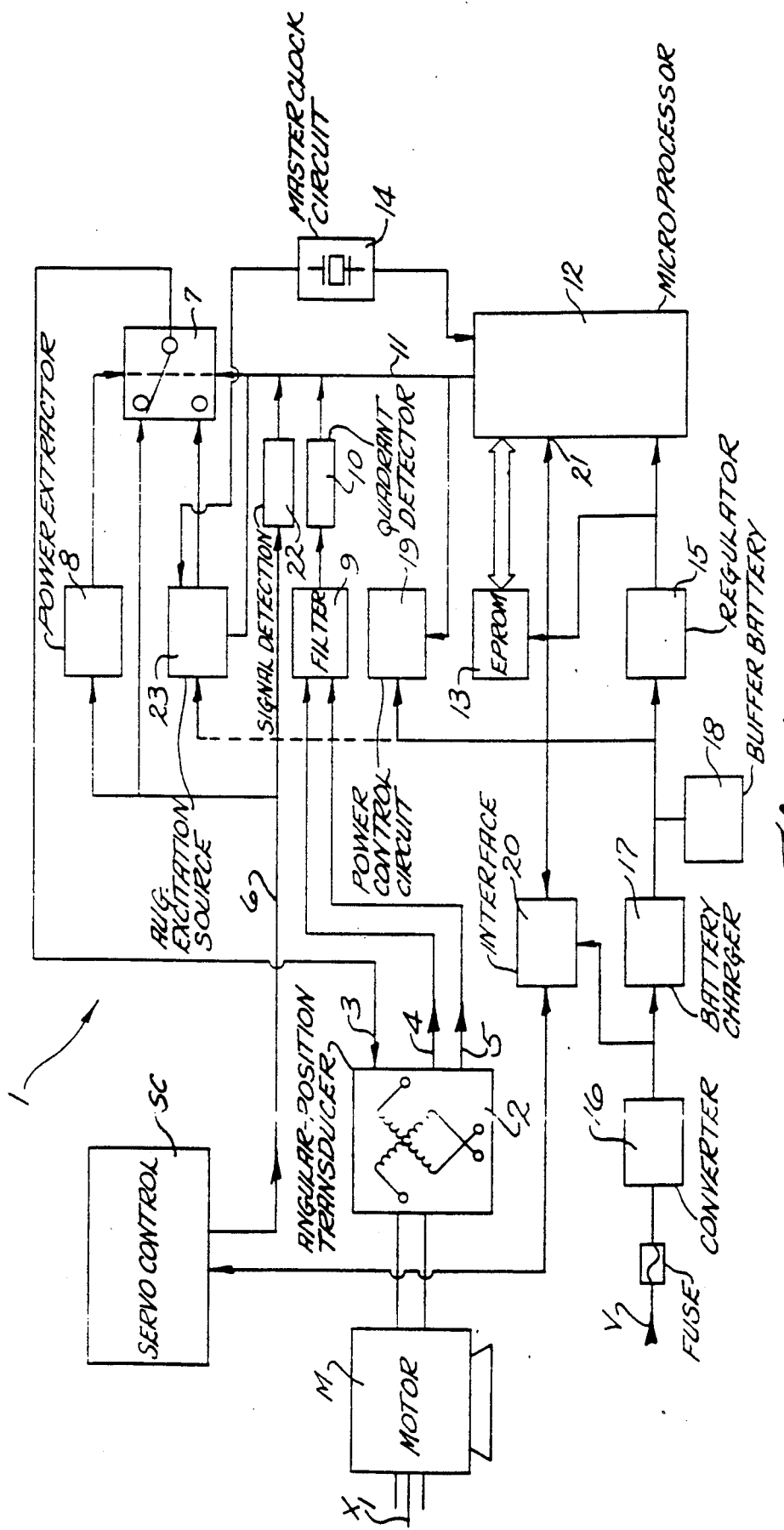

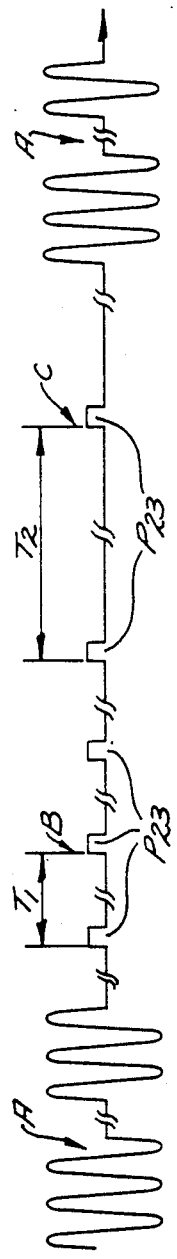
Fig.2a.
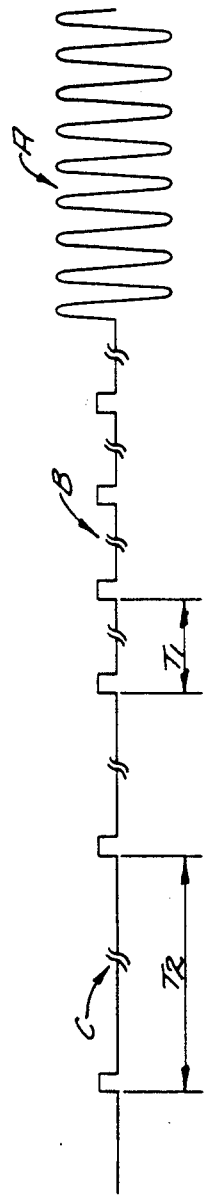
Fig.2b.
| | STORED QUADRANTS | | | |
|---|---|---|---|---|
| | 00 | 01 | 11 | 10 |
| 01 | OK | OK | +1 | ERR |
| 01 | OK | OK | ERR | OK |
| 11 | -1 | ERR | OK | OK |
| 10 | ERR | OK | OK | OK |
RESOLVER QUADRANTS
Fig.3.

DEVICE FOR TRACKING AND RECORDING THE POSITION REACHED BY A MOVING PART, IN PARTICULAR FOR INDUSTRIAL-ROBOT CONTROL

BACKGROUND OF THE INVENTION

The present invention relates in general to devices for recording the position reached by a moving part moved by a rotary motor.

The invention has been developed in particular with a view to the possible use for recording the position reached by one or more axes of an industrial robot.

Presently, in order to record the position reached by such a moving part, it is common to use an angular-position transducer associated with the motor. The transducer, usually consisting of a resolver, generates a signal indicating the angular position reached by the motor during a rotation. The signal generated by the resolver associated with each axis of movement of the robot is transmitted to a general control unit (or servo-control-SC) which keeps a cumulative count of the signal produced by each resolver, thus providing an absolute indication of the position of each moving part of the robot about its own particular axis of movement.

Such a known solution may, however, give rise to considerable drawbacks as regards use, substantially attributable to the fact that, when the robot is separated from its servocontrol (for example, in order to transfer it from the production premises to the user location, or from one user location to another) or when the servo-control is also momentarily de-energized (for example following a mains power failure), the information relating to the position reached by each moving part is lost.

The drawbacks are particularly great in the case of power supply failures which occur during the operational phases or while the robot is moving: in fact, the robot does not stop immediately when the power supply is interrupted (even if a brake is available to stop the movement). The robot continues to move for a few moments, owing to inertia, until it reaches a final stop position, which is not recorded by the transducer since the latter is no longer energized on account of the loss of power.

The effects of the abovementioned drawbacks may be lessened, at least partly, by using two cascade-connected angular transducers, for example two resolvers coupled together via a speed-reduction mechanism.

According to this configuration, the first resolver registers the momentary position reached, during a rotation, by the motor actuating the moving part, while the second resolver, connected to the first resolver via a speed-reduction mechanism such that the second resolver itself performs a single rotation during the possible travel of the moving part, provides an indication as to where, during the course of this travel, the moving part is located at a particular moment.

This solution, known as master/vernier or coarse/fine type, is impractical both in terms of space (two resolvers and a speed-reduction mechanism must be provided for each axis of movement of the robot) and in terms of cost (two resolvers with the associated precision gearing cost, in fact, more than a single resolver keyed onto the drive shaft).

SUMMARY OF THE INVENTION

The object of the present invention is to provide a device for recording the position reached by a moving part moved by a rotating shaft, which does not give rise to the abovementioned drawbacks and which, even if there is a failure in the external power supply, is able to retain the information relating to the position reached by a moving part of a robot with respect to all its possible axes of movement.

According to the present invention, this goal is achieved by means of a device of the type described above, characterized in that it comprises, in any assembly capable of being integrated with the said moving part:

an angular-position transducer (typically a resolver) associated with the said motor and capable of generating at least one signal indicating the position reached by the motor during a rotation, cumulative counting means supplied with the said at least one signal and capable of storing a cumulative count as to the levels reached by the said at least one signal; the said cumulative count indicating the position reached by the said moving part, and power supply means capable of keeping the said position transducer and said counting means active even when there is no external power supply.

The expression "capable of being integrated with the said moving part" is intended to indicate, in the claims which follow, a circuit assembly which can be coupled, functionally speaking, to the moving part (for example by means of direct mounting on the arm or on the base of the robot) such that it is able to remain together with the device during its active life, for example even when the robot is transferred from the production plant to a user site or from one user site to another.

Preferably, the device according to the invention also comprises means for sensing an interruption in the external power supply as well as timing means capable of activating selectively and in a substantially discontinuous manner the said transducer when there is a continued interruption in the external power supply. Preferably, the timing means can be activated at a first (generally low) frequency and at least a second frequency which is greater than the said first frequency and functionally linked to the nominal maximum acceleration or speed of the moving part.

When a failure in the external power supply occurs, the recording device according to the invention is therefore activated automatically without any loss of information. While the external power failure continues, in order to minimize the amount of energy used by the power supply means consisting usually of a buffer battery, the transducer (consisting usually of a resolver) is not activated continuously—as during normal operation of the device—but in a substantially discontinuous manner, with a pulsed excitation signal consisting preferably of a pulsed signal with a rectangular or trapezoidal waveform of a duration equal to a half-wave of the alternating mains voltage.

In particular, it is intended that such an excitation can be effected at a generally low frequency (for example, with an excitation pulse every 20 to 500 msec.), when the transducer detects that the moving part with which it is associated has stopped or more or less stopped. On the other hand, when the transducer detects a significant movement by the moving part, the excitation frequency is incresed, by at least one order of magnitude (for example by applying an excitation pulse every two msec.) so as to avoid any loss of information.

DETAILED DESCRIPTION OF THE INVENTION

The invention will now be described, purely by way of a non-limiting example, with reference to the attached drawings in which:

FIG. 1 shows, in the form of a block diagram, the general structure of a device according to the invention, FIG. 2, which is divided into two sections a and b, shows in schematic form a possible timing pattern of an excitation signal generated by the device shown in FIG. 1, FIG. 3 is a so-called truth table used in connection with the device shown in FIG. 1, and FIG. 4 shows schematically, in the form of a flow-chart, a possible operating sequence of the device shown in FIG. 1.

FIG. 1 is an overall view of a device intended to record the position reached by a moving part (for example a robot arm, not shown) moved by a rotary motor M, the shaft of which rotates about a corresponding axis $X_1$.

The coupling between the shaft of the motor M and the moving part (usually effected via a set of gears) is such that there is a direct relation between the position reached by the shaft of the motor M during successive rotations about the axis $X_1$ and the position reached by the moving part during its travel.

It must also be pointed out that the solution described below with specific reference to a single moving part moved by a corresponding motor M may be reproduced in multiple form—using methods which are well known to a person skilled in the art—so as to make it possible to register the position reached by a plurality of moving parts of an industrial robot, each of which are moved by a corresponding motor.

For example, in a typical example of an application, the device 1 according to the invention is intended to be used in conjunction with an industrial robot having six or eight possible axes of movement.

An angular-position transducer 2, usually consisting of a so-called resolver, is associated with the shaft of the motor M.

As is known, the resolver may be compared to a small rotating electrical machine consisting of a rotor and of a stator with two windings arranged at 90° (or vice-versa, two 90° windings on the rotor and one on the stator).

Using a sinusoidal excitation voltage applied to the terminals of one of the windings, it is therefore possible to obtain at the pairs of terminals of the two other windings two equally sinusoidal electromotive forces (generally orthogonal between them or sine and cosine waveform) indicating the angular position reached by the shaft of the motor with which the resolver 2 is associated.

In the schematic diagram shown in FIG. 1, the reference number 3 indicates overall the terminals of the excitation winding, while the reference numbers 4 and 5, on the other hand, indicate the pairs of output terminals at which the two angular-position signals with a sine and cosine waveform, respectively, are present.

During normal operation of the robot with which the device 1 is associated, a general control unit called a servocontrol SC, directly supplies the excitation voltage to the resolver 2. This is typically a sinusoidal voltage with a frequency of the order of 2.6 to 3.0 KHz or 5.0 KHz with an amplitude of the order of 32 volts or 5–6 volts peak-to-peak. These values are obviously intended as a guide only.

More precisely, the sinusoidal excitation voltage reaches the input 3 of the resolver 2 via a line 6 which extends from the servocontrol SC via a solid-state switch (for example a transistor) 7 associated with a power extractor 8.

In the preceding description, it has been assumed that the resolver 2 is arranged so as to provide an indication with an angular resolution equivalent to a quadrant, or 90°. Obviously, it is also possible to use resolvers capable of providing a finer resolution, for example of one octant.

It must also be pointed out that the choice of a resolver as an angular transducer 2 must not be regarded as restrictive for the purposes of implementing the invention: it is possible to consider the use of angular transducers of a different type, such as the inductosyn.

In any case, the angular transducer 2 is chosen so as to be able to monitor, without loss of information, the movements of the motor M of the moving part associated with it, up to the nominal maximum speed and acceleration levels.

For example, maximum speed values of the motor M, corresponding to 3000–6000 revs/min., together with accelerations of the order of 800 quadrants/s$^2$ may be taken into consideration.

The output signals generated on the lines 4 and 5 by the resolver 2 are sent to filter 9 consisting of passive components which have a high input impedance at the excitation frequency supplied to the resolver.

The characteristics of the filter 9, which is intended mainly to perform a noise-suppression function, must therefore be suited—in particular where a higher cut-off frequency is chosen—to the choice of excitation frequency.

For example, an acceptable input impedance value for the filter 9, in relation to both the sine and cosine channels 4 and 5, may be of the order of at least 500 KOhm at the excitation frequency. The roll-off frequency is usually chosen within the octave following the excitation frequency.

Both the sine and cosine signals 4, 5 leaving the filter 9 are sent to an angular-position recording device (quadrant detector) 10.

The latter must determine the algebraic sign of the sine and cosine signals. For this purpose it comprises a set of completely differential voltage comparators with a high input impedance.

In the simplest configuration possible, the circuit 10 comprises simply two comparators with a threshold about zero, capable of detecting the sign (positive or negative) of the sine and cosine signals and a logic network capable of generating at the output of the device 10, on a data bus line 11 of a microprocessor 12 acting as the microcontroller of the device 1, a 2-bit coded logic signal in accordance with the conversion table shown below.

| Quadrant number | Angular range | Algebraic sign (sine, cos.) | Binary code at output |
| --- | --- | --- | --- |
| 1 | 0–90° | + + | 00 |
| 2 | 90–180° | + − | 01 |
| 3 | 180–270° | − − | 10 |
| 4 | 270–360° | − + | 11 |

The conversion method proposed does not consist simply in the choice of allocating a given logic value (for example "0") to a positive sign of the sine or cosine signal and an opposite logic value ("1") to a negative sign.

A choice of this type would lead to the generation of a Gray-type binary code. In view of the subsequent processing of the signal, it is preferable, however, to have available at the output a binary code ascending in accordance with the normal pure-binary sequence.

This result may be obtained either by means of a conversion operation performed by an elementary logic network incorporated in the device 10 or by means of a conversion performed by the microprocessor 12 when the data is collected on the bus 11. In both cases, the operation in question is an elementary logic operation, the method of realization of which does not need to be described here in greater detail.

The binary coding described by the table shown above is advantageous for the purposes of loading, inside the data memory (usually a resident RAM) in the microprocessor 12, a cumulative item of data relating to rotation of the motor M (and hence positioning of the moving part associated with it), organized for example on a 16-bit string $S_1, S_2 \ldots S_{16}$ where:

$S_1, S_2$ (least significant bits) are the two bits resulting from the quadrant detection operation performed by the device 10, $S_3 \ldots S_{14}$ are twelve cumulative bits intended to express the position reached by the motor (and the moving part), with the possibility of recording up to $2^{12}$ different rotations.

$S_{15}$ is a free bit, available for the generation of markers or flags, and $S_{16}$ is a directional bit.

The rotational count increases or decreases when the resolver 2 and the circuits associated with it detect a transition between the quadrants 1 and 4. If the directional bit is at logic level "0", then the rotational count will be decreased when there is a transition from the quadrant 4 to the quadrant 1. If the directional bit is at "1", the rotational count will increase when there is a transition from the quadrant 1 to the quadrant 4. Obviously this is a solution of a conventional nature, illustrated here purely by way of a non-limiting example.

The frequency used for quadrant detection must be chosen so as to avoid the loss of information.

Detection or sampling must therefore be performed at a frequency which is correspondingly higher, the greater the permissible speed or acceleration of the moving part moved by the motor M.

For example, the maximum speed of the robots currently manufactured by the Applicants corresponds to a speed of rotation of the motor M of the order of 6000 revs/min. to which, by way of precaution (in order to take into account any momentary excess speed conditions), it is advantageous to add an additional margin of 1000 revs/min., giving an overall value of 7000 revs/min.

The maximum acceleration depends on a fairly high number of factors, such as the weight of the moving part and the load carried by it, the corresponding moments of inertia, the mechanical structure of the moving part, and the transmission ratios. By way of a guide, in the context of a normal application, a maximum acceleration value of the order of 800 quadrants/s$^2$ is feasible.

In general, taking into account also the presence of noise in the system, it is preferable to effect sampling of the angular position of the motor M at least twice for each quadrant at the maximum speed of movement, allowing, however, the microprocessor 12 a period of time to perform a minimum of processing on samples supplied by the resolver 2 (using procedures which will be described more fully below), before loading them as reading data inside its RAM.

Generally speaking, the option of effecting a sampling operation every millisecond may be considered an advantageous option, also with regard to the possibility of having a sampling frequency which is a submultiple of the normal excitation frequencies applied to the input 3 of the resolver 2.

As stated, it is also considered advantageous for the microprocessor 12 to process the rotational data supplied by the quadrant detector 10 before loading the same inside its RAM.

Such a processing function is able to take into account any reading errors using the criteria schematically illustrated in the truth table shown in FIG. 3.

In this table, the row entries correspond to the angular position (quadrant) as represented by the 2-bit logic signal supplied by the quadrant detector 10 on the basis of the criteria described above. The column entries, on the other hand, represent the momentary item of data previously stored by the microprocessor 12.

The possibility always exists that a kind of quadrant "quantization error" may occur when the resolver 2 is positioned at one of the sine or cosine axes. This quantization error has a certain importance at the transition of the two quadrants (1 and 4) which identify the zero point, i.e. the angular position at which, according to the criteria described above, there is an increase (or decrease) in the rotational count stored inside the microprocessor 12. The quantization errors at the other three transition points between the quadrants may, however, in general be ignored.

In the Table shown in FIG. 3, the entry "OK" stands for the conditions where the data supplied by the quadrant detector 10 corresponds to the data of the microprocessor 12.

The boxes marked "ERR" refer, on the other hand, to the situations where there is a divergence of 180° (two quadrants)—an indication that the device may have lost the exact information relating to the position of the motor M for the part controlled by the latter.

This situation may be signalled externally following a change in the logic level of a corresponding status bit.

In the table, the location of the symbols "+1" and "−1" corresponds to the situations where the two row and column entries differ only by one quadrant at the zero point. In this specific case, the microprocessor 12 will increase or decrease by 1 its value loaded in the corresponding memory register. In all cases, the microprocessor 12 stores its quadrant data and intervenes only by adjusting the rotational counts.

With regard to the choice of microprocessor or microcontroller 12, the choice of a component with 16-bit internal architecture and an external data bus is considered preferable.

Such a component is usually provided with an internal RAM memory which makes the use of a similar memory, located outside the microprocessor, superfluous.

The abovementioned component is characterized in particular by the fact that it is able to operate in "idle mode", with a minimum consumption of electrical power—something which is particularly advantageous for operation when there is an interruption in the external power supply—as described more fully below.

Operation of the microprocessor 12 is regulated by a program memory (operating system) consisting of an EPROM 13 and is timed by a master clock circuit 14 (shown, for the sake of clarity, as a component outside the microprocessor 12), using a d.c. voltage power supply of 5 volts, for example, supplied by a regulator 15.

The latter is connected to the power supply network V (consisting, in the example shown, of a d.c. voltage of 17–36 volts derived from the mains voltage via a power supply network of a known type, not shown) via a d.c./d.c. converter 16. The latter supplies a battery charger 17 intended to keep a buffer battery 18 charged.

In order that the assembly of the device 1 may be integrated with the controlled moving part, it is considered preferable to choose a lead-sealed battery operating at a voltage of 6 volts with a storage capacity of the order of 0.9 amperes hour.

In any case, it may be advantageous to provide connections for connection to an external battery of greater capacity.

The battery charger 17 is usually large enough to be able to charge the battery 18 completely up to its maximum capacity during a time period of the order of 0.5 hours.

Still with regard to energization of the internal components of the device 1, 19 indicates a power control circuit which is associated with the microprocessor 12. The main function of the circuit 19 is to enable all the active components of the device to be connected to the buffer battery 18 in the event of a main power failure.

In particular, the control circuit 19 is intended to allow—in the event of a main power failure—substantially discontinuous activation of the resolver 2 and of all the components which process the angular-position and rotational-count signals obtained from the the said resolver.

This substantially discontinuous operation is intended to minimize the amount of energy used by the buffer battery 18.

The reference number 20 indicates a connection interface which enables the microprocessor 12 to communicate via its serial port 21 with the servocontrol SC.

Bidirectional messages may be sent using different protocols, such as binary protocols and ASCII protocols.

During normal operation of the system, where the device 1 is energized (or the mains power supply is present), the angular-position data loaded in the microprocessor 12 by means of the signals generated by the resolver 2 (excited by the servocontrol SC via the line 6 and the switch 7) can thus be transferred to the servocontrol C.

This means that, apart from operation in conditions where there is a power failure (which will be described below), the device 1 is able to provide the servocontrol SC—during normal operation of the system—with already completely processed position and movement data.

The device according to the invention therefore enables the entire system CPU to be effectively decentralized, also with regard to any error correction functions performed using the criteria described above with reference to the table in FIG. 3.

In the event of an interruption in the external power supply, such as that which may occur because the robot is deactivated (for example for a temporary period of inactivity or in order to transfer it to another plant), or following a power failure, the servocontroller SC is no longer able to supply the sinusoidal signal for exciting the resolver 2 on the line 6.

The absence of the excitation signal is detected by a signal detection circuit 22, connected to the line 6, which transmits a corresponding message on the data bus 11 of the microprocessor 12.

The latter acts on the switch 7 and the control circuit 19, reconfiguring the device 1 so that all the active components of the same can be supplied by the buffer battery 18 and activating an auxiliary excitation source 23 included in the device 1 itself.

The auxiliary excitation source 23 is connected to the excitation input 3 of the resolver 2 by the switch 7, switching of which is controlled by the microprocessor 12.

The excitation signal applied by the source 23 to the input of the resolver 2 does not have a sinusoidal pattern, as in the case of ordinary operation of the system, but a generally pulsed pattern.

More precisely, it may consist of rectangular (or trapezoidal) pulses $P_{23}$ with a duration of about 100 microseconds, i.e. a duration equal to that of a halfwave of the sinusoidal excitation signal at 5 KHz applied to the resolver during normal operation.

The auxiliary excitation source 23 is activated by the control circuit 19 in accordance with the clock signal supplied by the circuit 14 at at least two different frequencies.

The first frequency (period $T_2$ in FIG. 2), which is generally low (for example one excitation pulse every 20–500 milliseconds), is intended to be used in idle mode, i.e. when it is reasonable to expect that the moving part associated with the motor M is moving very slowly (for example owing to a movement imparted manually by an operator during assembly or reconfiguration of the robot) or is not moving at all; in this latter case, it is merely necessary to check that the moving part does in fact stay in the same position.

The second frequency (period $T_1$ in FIG. 2), which is generally higher (at least by one order of magnitude), may correspond, for example, to the emission of one pulse every 2 milliseconds. This is a frequency, therefore, substantially comparable to the frequency at which, during normal operation of the system, the quadrant data provided by the device 10 is sampled.

This second excitation frequency is used each time the quadrant data obtained from the resolver 2 indicate that the motor M is moving rapidly or at speeds of movement comparable to those which arise during normal operation.

This situation may occur during the instant immediately following an interruption in the external power supply, when the moving part continues to move for a certain period of time owing to inertia (particularly if it is not braked) or during reactivation of the robot.

In general, switching to the high-frequency excitation stage may be effected automatically by the microprocessor 12 when the microprocessor 12 detects that the motor M is moving or is being made to move at a speed such that excitation at the low idle frequency could result in loss of the position data.

FIG. 2a shows in schematic form a possible sequence in which, from an ordinary operating condition of the system (phase A) in which the external power supply is present and the servocontrol SC normally supplies the excitation voltage to the resolver 2, one passes, following an external-power failure and the consequent impossibility for the servocontrol SC to excite the resolver 2, to emergency operation ensured by the device 1. In particular, during emergency operation, there is the following sequence:

a first phase B (movement of the robot owing to inertia) in which the source 23 supplies its excitation pulses $P_{23}$ at the higher frequency (for example one pulse $P_{23}$ with a duration of 100 microseconds, every 1.1 milliseconds), and a second idle phase C in which, after the microprocessor 12 has detected that there is no movement or no rapid movements, the source 23 is driven for operation at the lower frequency, pulses $P_{23}$ being emitted at intervals, for example, of 20 milliseconds.

After remaining in phase C for a certain period of time, upon restoration of the mains power supply (with the consequent renewed generation of the sinusoidal excitation voltage by the servocontrol SC), operation of the system returns to phase A described above.

FIG. 2b shows in schematic form a situation in which the transition from low-frequency idle operation (phase C) to ordinary operation of the system (phase A) does not occur directly, but involves the return to a rapid excitation phase (phase B), for example owing to a rapid movement imparted to the robot by an external operator.

Figure 4:
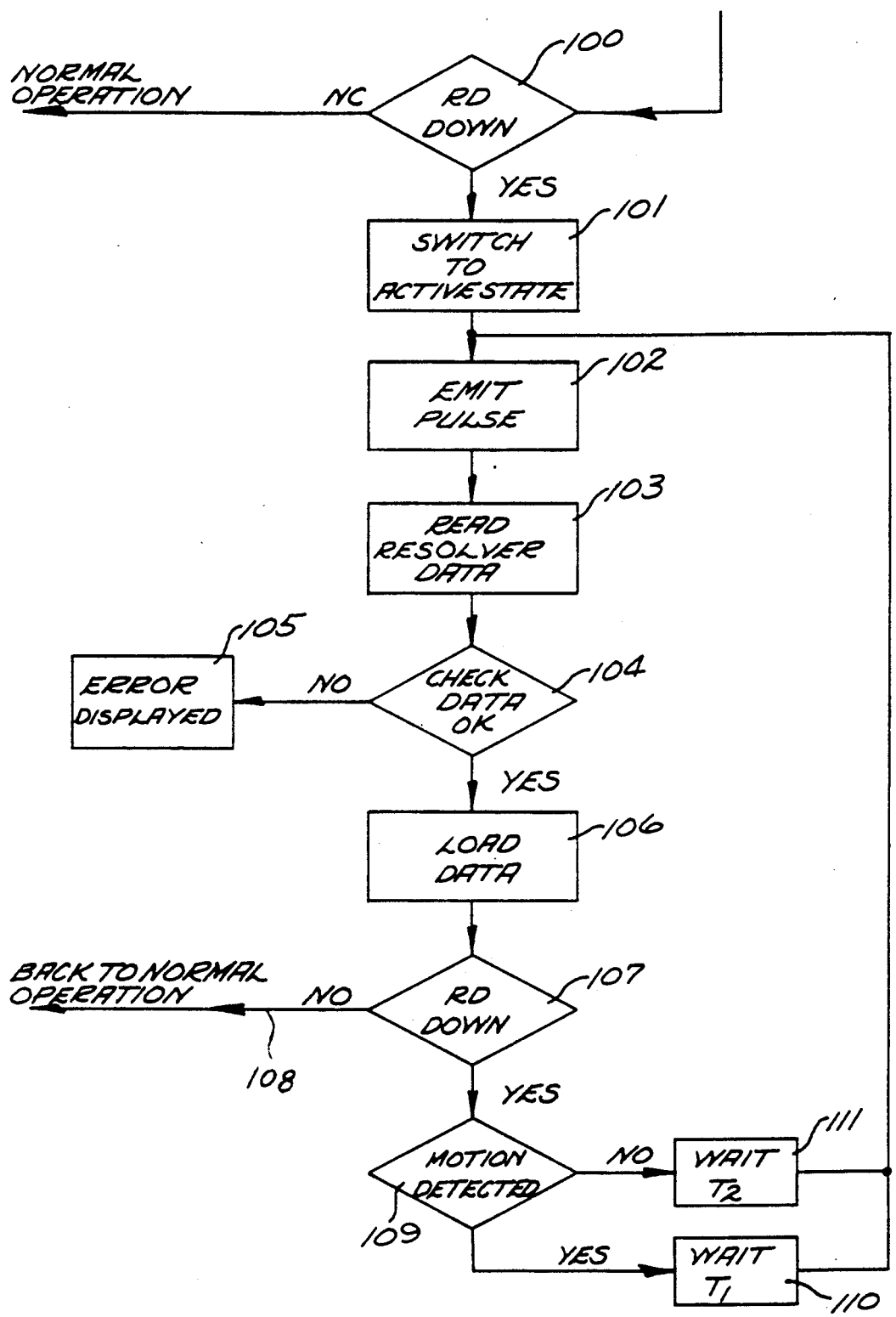
FIG. 4 shows schematically, in the form of a flowchart, a possible logic sequence for operation of the microprocessor 12.

In the flowchart shown in FIG. 4, stage 100 is a test which the microprocessor is able to carry out each time a quadrant-data read cycle occurs, in order to check whether the signal detector 22 indicates possible interruption of the power supply and of the sinusoidal excitation voltage supplied by the servocontroller SC.

When these conditions do not occur, the microprocessor 12 continues to regulate operation of the device 1 according to the criteria for normal operation of the system, transmitting, if necessary, angular-position data to the servocontroller SC via the communication interface 20.

When, on the other hand, the microprocessor 12 receives from the signal detector 22 the message indicating an interruption in the power supply and sinusoidal excitation voltage, the microprocessor 12 itself, during a subsequent stage 101, causes switching of the switch 7 and subjects the entire device 1 to the power supply provided by the buffer battery 18 under the control of the device 19.

At this point, the microprocessor 12 is able to cause the auxiliary source 23 to send an excitation pulse to the resolver 2 (stage 102), so as to proceed subsequently (in accordance with the criteria described above with reference also to the table in FIG. 3) with reading of the angular data supplied by the detector 10.

In particular, this may consist in a data read operation 103 followed by a checking operation 104, during which the truth table shown in FIG. 3 is applied, with a possible exit either to an error display operation 105 (in the case where there is a return to one of the conditions identified by the boxes along the diagonal of the table in FIG. 3) or to normal loading 106 of the data read inside the memory of the microprocessor 12.

After a checking operation 107, in which the microprocessor 12 reads the status of the signal detector 22 (reconfiguring the device for normal system operation—line 108—in the event that the circuit 22 indicates restoration of the external power supply and sinusoidal excitation voltage by the servocontroller SC), the microprocessor 12 itself proceeds to a further checking operation 109, checking whether the loaded data indicates a movement with respect to the previously stored position.

The outcome of the test conducted during stage 109 enables the microprocessor 12 to establish whether stage 102 must be returned to, with a new excitation pulse being emitted, once one or other of the two periods ($T_1$ or $T_2$) corresponding to the two different possible excitation frequencies has lapsed.

For as long as it continues to detect movement, the microprocessor 12 continues to activate the auxiliary source 23 (stage 110) so as to obtain pulsed excitation of the resolver 2 at the higher frequency (phase B of FIG. 2a).

When the comparison with the previous reading operation indicates that no movement has been detected (a sign that the moving part of the robot has stopped or is moving at a slow speed), stage 102 is returned to after a wait period 111 of duration equal to the duration of the period $T_2$, thereby establishing the so-called idle mode conditions.

However, as soon as the check indicates the existence of a movement, there is a return again to the stage 102 where a new excitation pulse is emitted via the stage 110 or after a wait period of duration equal to that of the period $T_1$ in FIG. 2.

Obviously, the principle of the invention remaining the same, the details as to implementation and the embodiments may be varied considerably with respect to that described and illustrated, without, however, going outside the scope of the present invention.

We claim:

1. Device for recording the position reached by a moving part moved by a rotary motor (M), characterized in that it comprises, in an assembly capable of being integrated with the said moving part,
    an angular-position transducer (2) associated with the said motor (M) and capable of generating at least one signal (4,5) having signal level transitions indicating the position reached by the motor (M) during a rotation,
    processing means (12) supplied with the said at least one signal (4, 5, 9, 10) capable of storing a cumulative count of the signal level transitions reached by the said at least one signal (4, 5), the said cumulative count indicating the position reached by the said moving part,
    power supply means (18, 23) capable of keeping the said position transducer (2) and the said processing means (12) active, even when there is no external power supply (V),
    means (22) for sensing an interruption in the said external power supply, and
    excitation means (23) capable of activating the said transducer (2) selectively and in a substantially discontinuous manner ($T_1$, $T_2$) when the interruption in the external power (V) is detected.

2. Device according to claim 1, characterized in that the said angular-position transducer (2, 9, 10) is configured so as to generate the said at least one signal indicating the position reached by the motor (M) during a rotation, in the form of a binary signal, and in that the said processing means change the said binary signal in the least significant bit positions of a bit string ($S_1 \ldots$ $S_{16}$) which effects the said cumulative count as a binary count ($S_3 \ldots S_{14}$).

3. Device according to claim 2, characterized in that the said angular-position transducer (2, 9, 10) is configured so as to generate originally the said binary signal indicating the position reached by the motor (M) during a rotation, in the form of a cyclical Gray-coded binary signal, with subsequent conversion of the binary signal into a pure-binary signal.

4. Device according to claim 2, characterized in that a resolver (2) constituting the said angular-position transducer has, associated with respective output channels (4, 5), threshold comparator circuits (10), each of which generates binary signals with two logic levels (0,1) corresponding to the polarity of the signal present on the respective output channel (4,5) of the resolver (2).

5. Device according to claim 4, characterized in that filtering means (9) are interposed between the output channels (4,5) of the resolver (2) and the said comparator means (10).

6. Device according to claim 1, characterized in that the said excitation means can be activated at a first frequency ($T_2$) and at least a second frequency ($T_1$) greater than the said first frequency ($T_2$) by one order of magnitude.

7. Device according to claim 6, characterized in that it comprises processing means (12) capable of detecting (109), by means of the said at least one signal (4,5) indicating the position reached by the motor (M), movement of the motor (M) itself, and in that the said excitation means (23) are supplied at the said second frequency when the movement of the motor (M) is detected.

8. Device according to any one of the preceding claims, characterized in that the said angular-position transducer (2) is a resolver.

9. Device according to claim 8, characterized in that the said angular-position transducer (2) has a given angular-resolution factor and in that the said processing means (12) comprise an error-detection function (104, FIG. 3) for generating an error message when the said angular-position transducer (2) indicates angular displacement of the said motor (M) greater than the said given angular resolution factor.

10. Device according to claim 8, characterized in that the said angular-position transducer (2) is capable of operating with a sinusoidal excitation signal when the said external power supply is present and in that the said excitation means (23) are capable of applying a pulsed excitation signal with a polygonal waveform ($P_{23}$) to the said angular-position transducer.

11. Device according to claim 10, characterized in that the said pulsed signal has a duration substantially equal to the duration of a half-wave of the said sinusoidal excitation signal.

12. Device according to any one of claims 1, 6 or 7, characterized in that the said power supply means (18) comprise a battery-charging element (17) and a buffer battery (18) capable of being charged by the said battery charger.

13. Device according to any one of claims 1, 6, 7, 2, 3 or 5, intended to be used within a system comprising a main control unit (SC), characterized in that a data transmission channel (20) for transferring the said cumulative count indicating the position reached by the said moving part from the said cumulative counting means (12) to the said main control unit (SC).

14. Device according to claim 13, intended to be applied in a system in which the said central control component (SC) is capable of generating an excitation signal (6) for the said angular-position transducer (2), characterized in that the said sensing means (22) are capable of detecting the absence of the said excitation signal (6) generated by the said main control component (SC).

* * * * *